March 12, 1946.    J. M. W. CHAMBERLAIN    2,396,491
SEALING RING AND ASSEMBLY COMPRISING THE SAME
Filed Dec. 2, 1943    3 Sheets-Sheet 1

INVENTOR
JAMES M. W. CHAMBERLAIN
BY
Willard D. Eakin
ATTORNEY

March 12, 1946.  J. M. W. CHAMBERLAIN  2,396,491
SEALING RING AND ASSEMBLY COMPRISING THE SAME
Filed Dec. 2, 1943  3 Sheets-Sheet 2
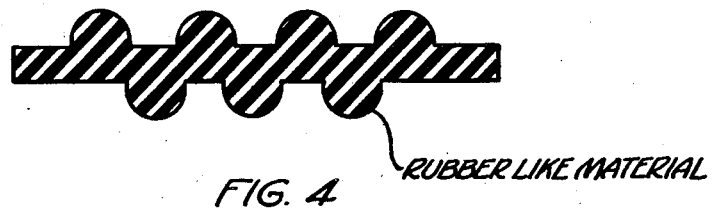
FIG. 4  RUBBER LIKE MATERIAL
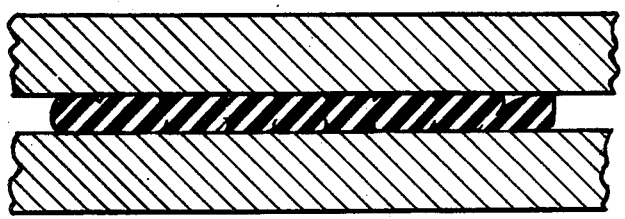
FIG. 5
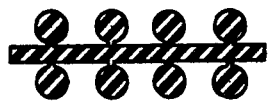
FIG. 6
INVENTOR
JAMES M. W. CHAMBERLAIN
BY
Willard D. Eakin
ATTORNEY March 12, 1946.  J. M. W. CHAMBERLAIN  2,396,491
SEALING RING AND ASSEMBLY COMPRISING THE SAME
Filed Dec. 2, 1943  3 Sheets-Sheet 3

INVENTOR
JAMES M. W. CHAMBERLAIN
BY
Willard D. Eakin
ATTORNEY

Patented Mar. 12, 1946

2,396,491

UNITED STATES PATENT OFFICE 2,396,491

SEALING RING AND ASSEMBLY COMPRISING THE SAME

James M. W. Chamberlain, Akron, Ohio

Application December 2, 1943, Serial No. 512,562

6 Claims. (Cl. 285—115)

This invention relates to rings of resilient material for providing a fluid seal between sections of pipe.

Its chief objects are to provide a sealing ring adapted to be easily mounted in an annular space between inner and outer pipe surfaces, throughout a wide range of dimension tolerances, and yet adapted to provide an effective fluid seal; to provide a ring adapted to seal effectively throughout a wide range of fluid pressures, with a desirably graduated increase of "self-energizing" effect as the pressure of the fluid sealed against is increased; and, more specifically, to provide a self-energized ring which will serve adequately as a simple compression gasket when the pressure is low and will avoid excessive "spitting through" upon the application of the initial self-energizing pressure as well as upon the application of additional slow or sudden increments of pressure throughout a wide range.

Of the accompanying drawings:

Fig. 4 is a cross-section of a sealing of a somewhat different cross-sectional shape.

Fig. 5 is a fragmentary section of mating pipe sections with the gasket of Fig. 4 mounted between them.

Fig. 6 is a cross-section of a sealing ring of still another cross-sectional shape.

Figure 1:
Fig. 1 is a cross section of a sealing ring embodying my invention in its preferred form, crosshatched as being composed of rubber or rubberlike material but with the hatching disposed in such direction as to indicate, in other views, the distortions that occur within the material in the use of the ring.
Figure 2:
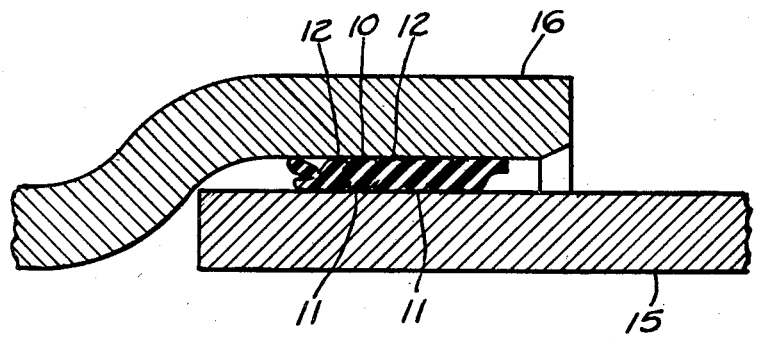
Fig. 2 is fragmentary section of mating portions of bell-and-spigot pipes with the sealing ring of Fig. 1 in place between them.
Figure 3:
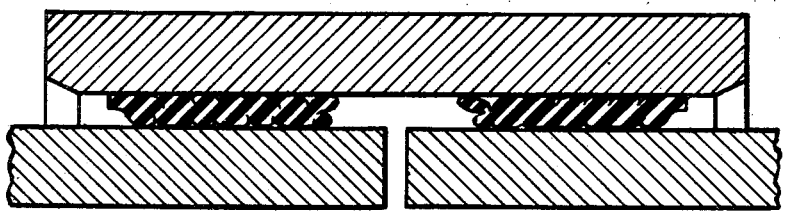
Fig. 3 is a similar fragmentary section of a sleeve-type joint connecting two sections of straight-surfaced pipe, with a pair of gaskets like that of Fig. 1 mounted in the annular spaces between the sleeve and the surfaces of the respective pipe sections.

Referring to the drawings, the sealing ring shown in Figs. 1 to 3 comprises a medial, annular web portion 10, an inner series of annular spaced-apart ribs, 11, 11, an outer series of spaced-apart annular ribs 12, 12, and, at one end of the annular web portion 10, an inner lip-seal rib 13 and an outer lip-seal rib 14.

The inner ribs 11 and the outer ribs 12 are arranged in staggered relation, but are unsymmetrically staggered, in that certain of the inner ribs overlap certain of the outer ribs past respective planes perpendicular to the axis of the ring.

This arrangement is such that when one of the rings is mounted upon the spigot 15 of Fig. 2 and prevented from sliding thereon either by its own frictional grip alone or augmented by the use of an adhesive and the spigot with the ring thereon is pushed into the bell 16 the inner ribs roll to the right on the spigot's outer surface, and the outer ribs roll to the left on the bell's inner surface, as indicated by the inclined positions of the hatch lines on the ribs, flexing of the web portion 10, as indicated by the sinuosity of the web's hatch line in Fig. 2 permitting this rolling of the ribs.

Thus initially rolling of the ribs is resisted only by resistance of the web to flexure, but if the annular space between the rigid members is relatively narrow radially this initial mounting movement may in itself cause such rolling of the ribs of one set, with adjacent web portions, into the spaces between the ribs of the other set, as to develop radial compressive forces substantially greater than those represented by only the flex-resistance of the web.

The construction is such, however, that the over-all radial dimension of the ring in cross-section can be greatly decreased in this mounting operation without developing excessive radial forces and thus the ring is adapted for easy insertion even though wide tolerances are allowed as to the radial dimension of the annular space.

The angular relation of the inner lip-seal rib 13 is such that it rolls on the spigot surface in the same direction as the other inner ribs, whereas the outer lip-seal rib, 14, has initially such angular relation that the mounting movement of the pipes causes it to slide leftward on the inner surface of the bell, if the annular space is radially that narrow, and thus the two ribs 13 and 14 are brought into such positions as to seal in the manner of a lip-gasket against the surfaces of the spigot and the bell respectively.

Such lip-seal effect need not be perfect, however, and the invention is not wholly limited to a ring having lip-sealing means, as is apparent upon inspection of Figs. 4 to 7.

The effectiveness of the ring throughout wide ranges of tolerance and throughout a wide range of pressure seems to be explainable upon the assumption that as the fluid pressure is applied or increased, from the left of Fig. 2, to so great a magnitude, the ring as a whole is shortened lengthwise of the pipes by a forward rolling of some or all of the ribs, with the rolling movement greater for each rib than for the rib next ahead of it, and with the radial pressure, and consequently the resistance to sliding of the gasket elements on the pipe surfaces, cumulatively greater from the right-hand portion to the left-hand portion of the ring as viewed in Fig. 2.

As the two ribs of each pair roll forward they, in the manner of a pair of wringer rolls, feed forward the intervening portion of the web, and this may contribute to the compacting of the ring as a whole.

The lip-seal ribs 13, 14 are so formed and positioned as to apply a substantial axial force directly to the web 10, under the force of the fluid, in the initiating of the self-energizing effect, and if they become established as completely-sealing lips, then their force against the web is the only force impelling the rightward rolling movements of the ribs 11 and 12 above referred to, which increases the latter's radial, gripping, anchoring pressure as above described, with slight slippage of the lip-seal ribs on the pipe surfaces as the sealing ring as a whole shortens axially under the pressure of the fluid sealed against.

The rings 10ª and 10ᵇ of Fig. 3 are the same as the ring of Figs. 1 and 2, but they are mounted in oppositely facing positions as is of course appropriate for the sleeve-type joint there shown.

The ring illustrated in Figs. 4 and 5 functions in substantially the same manner as that above described with relation to Figs. 1 to 3, except that the lip-sealing ribs are omitted, but is of such cross-sectional shape as to have a higher ratio of force to deformation.

Figure 7:
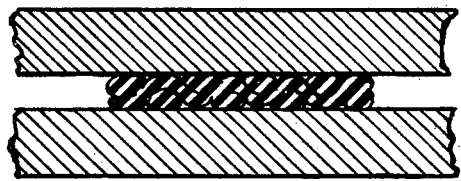
Fig. 7 illustrates the ring of Fig. 6 in use.

The ring illustrated in Figs. 6 and 7 also functions in substantially the same way, but is shaped for low ratio of force to deformation, and is thus especially adapted for spaces of widely varying radial widths.

Figure 8:
Fig. 8 is a cross-section of a ring formed with a lip-seal end portion.
Figure 9:
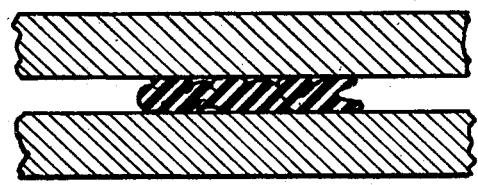
Fig. 9 illustrates the ring of Fig. 8 in use.

In Figs. 8 and 9, wherein the ring happens to be shown in position for sealing against fluid pressure from the right, the ring is adapted to function in the same way as the ring of Figs. 1 to 3, but it is shown with sealing lips of more conventional form and adapted to have a relatively high initial pressure against the pipe surfaces.

Further modifications are possible within the scope of the appended claims.

I claim:

1. A sealing ring assembly comprising a pair of members respectively having inner and outer substantially cylindrical surfaces defining between them an annular space to be sealed, a resiliently deformable ring adapted to lie in said annular space and comprising a flexibly thin, distortable, annular web portion and, integral therewith, inner and outer sets of axially spaced apart annular ribs of such height as to force said web into sinuous form upon the mounting of the ring in said space and formed with annular surfaces rounded transversely of the ribs for contact with the first mentioned surfaces.

2. A sealing ring assembly comprising a pair of members respectively having inner and outer substantially cylindrical surfaces defining between them an annular space to be sealed, a resiliently deformable ring adapted to lie in said annular space and comprising a flexibly thin, distortable, annular web portion and, integral therewith, inner and outer sets of axially spaced apart annular ribs of such height as to force said web into sinuous form upon the mounting of the ring in said space and formed with annular surfaces rounded transversely of the ribs for contact with the first mentioned surfaces, the ribs being in staggered relation.

3. A sealing ring assembly comprising a pair of members respectively having inner and outer substantially cylindrical surfaces defining between them an annular space to be sealed, a resiliently deformable ring adapted to lie in said annular space and comprising a flexibly thin, distortable, annular web portion, and, integral therewith, inner and outer sets of axially spaced apart annular ribs of such height as to force said web into sinuous form upon the mounting of the ring in said space and formed with annular surfaces rounded transversely of the ribs for contact with the first mentioned surfaces, the ring being formed also with a pair of flexible annular lips on one of its annular end margins for sealing against the first mentioned surfaces respectively.

4. A sealing ring of resiliently deformable material of such size and shape as to lie wholly within an annular space defined by substantially cylindrical inner and outer surfaces, the ring comprising a flexibly thin, distortable, annular web portion and, integral therewith, inner and outer sets of axially spaced apart annular ribs of such height as to deform said web into sinuous form upon the mounting of the ring in said space and formed with annular surfaces rounded transversely of the ribs for contact with the first mentioned surfaces.

5. A sealing ring of resiliently deformable material of such size and shape as to lie wholly within an annular space defined by substantially cylindrical inner and outer surfaces, the ring comprising a flexibly thin, distortable, annular web portion and, integral therewith, inner and outer sets of axially spaced apart annular ribs of such height as to deform said web into sinuous form upon the mounting of the ring in said space and formed with annular surfaces rounded transversely of the ribs for contact with the first mentioned surfaces, the ribs being in staggered relation.

6. A sealing ring of resiliently deformable material of such size and shape as to lie wholly within an annular space defined by substantially cylindrical inner and outer surfaces, the ring comprising a flexibly thin, distortable, annular web portion and, integral therewith, inner and outer sets of axially spaced apart annular ribs of such height as to deform said web into sinuous form upon the mounting of the ring in said space and formed with annular surfaces rounded transversely of the ribs for contact with the first mentioned surfaces, the ring being formed also with a pair of flexible annular lips on one of its annular end margins for sealing against the first mentioned surfaces respectively.

JAMES M. W. CHAMBERLAIN.